United States Patent [19]
Nisimura

[11] Patent Number: 5,679,292
[45] Date of Patent: Oct. 21, 1997

[54] PROCESS FOR PRODUCING CORDIERITE CERAMIC BODY

[75] Inventor: Mamoru Nisimura, Nagoya, Japan

[73] Assignee: Nippondenso Co., Ltd., Kariya, Japan

[21] Appl. No.: 516,700

[22] Filed: Aug. 18, 1995

[30] Foreign Application Priority Data

Aug. 25, 1994 [JP] Japan .................. 6-225904
Jul. 25, 1995 [JP] Japan .................. 7-209949

[51] Int. Cl.$^6$ .................................. C04B 35/195
[52] U.S. Cl. .................. 264/37; 264/56; 264/63; 501/119; 501/155
[58] Field of Search .................. 264/37, 56, 63; 501/119, 155

[56] References Cited

U.S. PATENT DOCUMENTS 4,295,892 10/1981 Matsuhisa et al. .................. 501/119
4,476,236 10/1984 Inoguchi et al. .................. 501/119
4,851,376 7/1989 Asami et al. .................. 264/66

FOREIGN PATENT DOCUMENTS 3-72032 11/1991 Japan .

*Primary Examiner*—James Derrington
*Attorney, Agent, or Firm*—Cushman, Darby & Cushman IP Group of Pillsbury Madison & Sutro LLP

[57] ABSTRACT

An unfired recycled material recovered in the course of the production of a cordierite ceramic body is comminuted to prepare a comminuted material. The comminuted material is then subjected to size separation to remove fine particles with diameters of less than 1 mm from the comminuted material while retaining coarse particles with diameters of not less than 1 mm. Water is added to the comminuted material with particle diameters of not less than 1 mm, and the mixture is kneaded to prepare a reprocessed clay. The reprocessed clay is formed into a shape which is then fired to prepare a cordierite ceramic body.

4 Claims, 2 Drawing Sheets

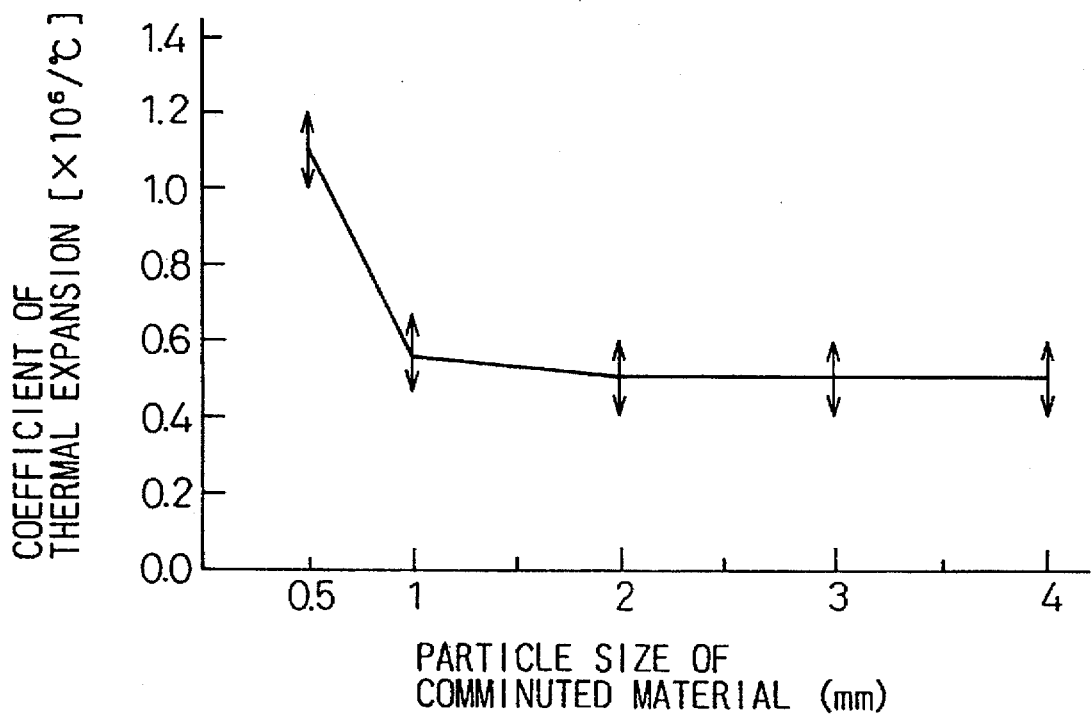

PROCESS FOR PRODUCING CORDIERITE CERAMIC BODY

BACKGROUND OF THE INVENTION

1. Field of the Invention

The present invention relates to a process for producing a cordierite ceramic body from an unfired recycled material recovered in the course of the production of a cordierite ceramic body.

2. Description of Related Art

Cordierite ceramic bodies are known to have heat resistance and a low coefficient of thermal expansion over a wide temperature range. By virtue of these properties, they have attracted attention particularly as a honeycomb carrier for a catalyst for removing HC, CO, $NO_x$ and the like contained in various exhaust gases.

In the production of cordierite ceramic bodies, starting materials such as talc, kaolin, and alumina are formed into a desired shape, and the shape is then fired. In order to realize a low coefficient of thermal expansion of the cordierite ceramic body, it is necessary to optimize the diameter of the starting materials, the composition the starting materials, and the like.

Further, the use as a recycled material of an unfired off-specification formed body or a waste material, such as fragments of the formed body, removed in the transfer of a formed body from the step of forming to the step of firing, is desirably used for the production of cordierite ceramic bodies in a cost-effective manner.

The cordierite ceramic bodies produced using the above recycled material, however, have a high coefficient of thermal expansion, resulting in deteriorated heat resistance. They cannot be used particularly as a catalyst carrier for the purification of an automobile exhaust gas where low thermal expansion is required.

In order to overcome the above problem, Japanese Examined Patent Publication (Kokoku) No. 3-72032 proposes a method wherein a recycling material is prepared so that, in an X-ray diffraction pattern in a pressed face of a cordierite ceramic body, the intensity of a peak attributable to a protenstatite face and the intensity of a peak attributable to a cordierite face have a given value.

In this method, no specific means for preparing a recycled material is disclosed, making it impossible for a person having an ordinary skill in the art to simply prepare a satisfactory recycled material for the production of a cordierite ceramic body.

In view of the above problems of the prior art, an object of the present invention is to produce, using a recycled material, a cordierite ceramic body having a low coefficient of thermal expansion at low cost.

SUMMARY OF THE INVENTION

According to one aspect of the present invention, there is provided a process for producing a cordierite ceramic body from an unfired recycled material recovered in the course of the production of a cordierite ceramic body, comprising the steps of:

comminuting (reducing in size) the recycled material to prepare a comminuted material;

removing fine particles with diameters of less than 1 mm from the comminuted material;

adding water to the remaining coarse particles with diameters of substantially not less than 1 mm and kneading the mixture to prepare a reprocessed clay;

forming the reprocessed clay into a shape; and firing the shaped body.

Preferably, the comminuted material is subjected to size separation to remove the fine particles with diameters of less than 1 mm while retaining the coarse particles with diameters of substantially not less than 1 mm. Further, the comminuted coarse particles obtained by the size separation preferably have diameters ranging from 1 mm to 200 mm.

According to another aspect of the present invention, there is provided a process for producing a cordierite ceramic body from an unfired recycled material recovered in the course of the production of a cordierite ceramic body, comprising the steps of:

comminuting the recycled material to prepare a comminuted material;

subjecting the comminuted material to size separation under conditions of an amount of a comminuting material of 100 kg, a size of screen opening of 1 mm, an acceleration of vibrations of 0.1 G, and a capacity of screening of 30 kg/min or such conditions as will provide a higher level of separation efficiency;

adding water to the resultant oversize material and kneading the mixture to prepare a reprocessed clay; and forming the reprocessed clay into a shape and firing the shape.

Preferably, the comminuted material is subjected to size separation to remove the fine particles with diameters of less than 1 mm while retaining the coarse particles with diameters of substantially not less than 1 mm. Further, the comminuted coarse particles obtained by the size separation preferably have diameters ranging from 1 mm to 200 mm.

BRIEF DESCRIPTION OF DRAWING

FIG. 1 is a characteristic diagram showing the relationship, between the particle size of a comminuted material and the coefficient of thermal expansion of a cordierite ceramic body, determined in Example 2.

DETAILED DESCRIPTION OF THE INVENTION

Figure 2A:
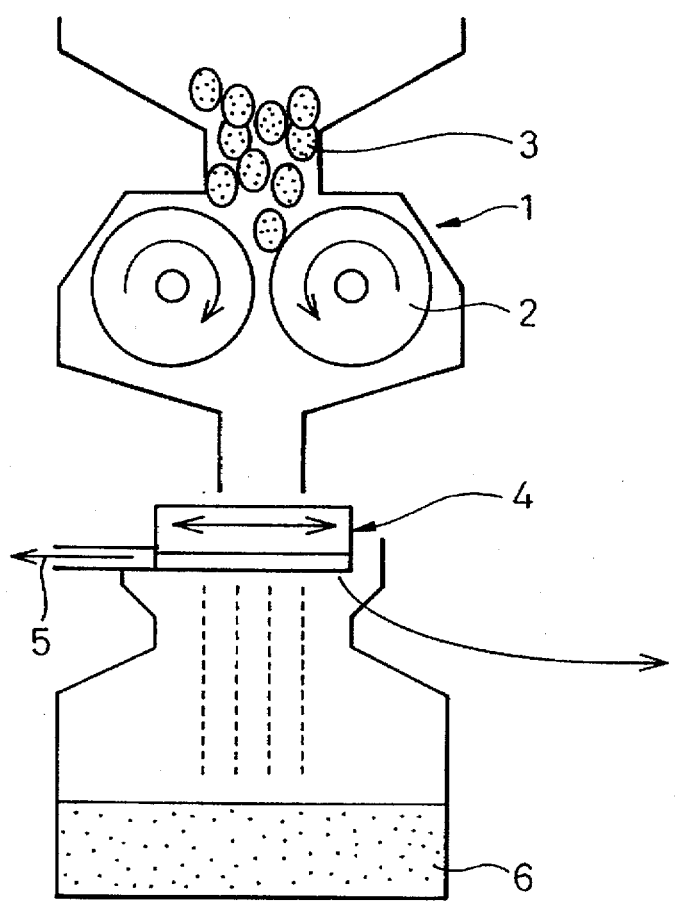
FIG. 2A shows a roll crusher-type comminuting apparatus used in Example.

In the present invention, what is most noteworthy is to comminute the above recycled material followed by size separation to remove fine particles having diameters of less than 1 mm with coarse particles having diameters of not less than 1 mm being retained for use in the production of a cordierite ceramic body.

The recycled material is an unfired formed body not utilized in the production of a cordierite ceramic body or fragments of the formed body. The recycled material has a general composition of a cordierite ceramic body, i.e., comprises talc, kaolin, alumina and the like. A fresh cordierite material may be added to and mixed with the recycled material.

The recycled material is used after comminution. It contains a binder used in conventional cordierite ceramic bodies. Since the binder serves to bond constituent particles of the cordierite ceramic body to one another, the recycled material is in the form of a relatively large mass. Therefore, the massive recycled material should be comminuted into individual particle size fractions.

Preferably, the recycled material is previously dried to facilitate the comminution.

The degree of comminution is such that the comminuted material contains a sufficient amount of particles with diameters of not less than 1 mm. Comminution machines usable for the size reduction include jaw crushers, roller mills, and pin mills.

The comminuted product, prior to use, is subjected to size separation by screening, pneumatic classification or the like, thereby removing all particles with diameters of less than 1 mm. The use of a commuted material containing particles with diameters of less than 1 mm makes it difficult to produce a cordierite ceramic body having a low coefficient of thermal expansion.

The particles retained by the size separation may have a diameter of not less than 1 mm. For example, comminuted product particles having diameters of not less than 2 mm may be retained for the production of a cordierite ceramic body.

The maximum diameter of the comminuted material particles is preferably 200 mm.

When the maximum diameter exceeds this value, the addition of water followed by kneading for the production of a reprocessed clay becomes difficult.

The diameter of the comminuted material particles may be measured by the residue-on-screen method using an opening size of not less than 1 mm.

Water is added to the comminuted material particles having diameters of not less than 1 mm, and the mixture is kneaded and formed into a desired shape. In the kneading, it is possible to add a binder such as methyl cellulose.

The formed body is then fired at substantially the same temperature as used in the step of firing in the production of conventional cordierite ceramic bodies. More specifically, firing at a temperature in the range of from 1350° to 1450° C. is preferred. When the firing temperature is below 1350° C., there is a possibility that good cordierite crystals cannot be provided. On the other hand, when it is above 1450° C., the formed body is likely to be melted.

The formed body is preferably dried prior to firing. This prevents the cordierite ceramic body from cracking due to rapid evaporation of water during firing.

In the process for producing a cordierite ceramic body according to the present invention, the recycled material is comminuted, the comminuted material is subjected to size separation, and comminuted material particles with diameters of substantially not less than 1 mm are used as the starting material for the production of a cordierite ceramic body.

Talc, kaolin, alumina and the like constituting the comminuted material particles with diameters of not less than 1 mm are less likely to be damaged and are in a flat form. For this reason, the crystal axis of the compounding material in the comminuted material can be oriented by the pressure applied during forming.

When the resultant formed body is fired, orientation is found also in the sinter. Therefore, an anisotropic cordierite ceramic body having a different coefficient of thermal expansion in the direction of crystal axis can be provided.

Thus, in the production process according to the present invention, scrap recovered in the course of the production of a cordierite ceramic body can be effectively utilized as a recycled material. This contributes to a marked improvement in yield of starting material, which leads to a reduction in cost and enables cordierite ceramic bodies to be produced at low cost.

Cordierite ceramic bodies produced by the production process according to the present invention can be effectively used as a honeycomb carrier in devices for purifying automobile exhaust gases. They may be also used in heat exchangers for industries and the like.

The present invention can provide a process for producing a cordierite ceramic body, which enables cordierite ceramic bodies having a low coefficient of thermal expansion to be produced using a recycled material at low cost.

EXAMPLES

Example 1

A cordierite ceramic body is prepared by one embodiment of the process for producing a cordierite ceramic body according to the present invention. In this example, an unfired recycled material recovered in the course of the production of a cordierite ceramic body is used to produce a cordierite ceramic body.

The above material is an unfired, dried material having a composition specified in Table 1. 100 kg of the dried material was fed into a roll crusher and crushed under conditions of a frequency of revolutions at 50 RPM and a capacity of crushing of 20 kg/min, to obtain a communication material having an average particle size of 3 mm.

Figure 2B:
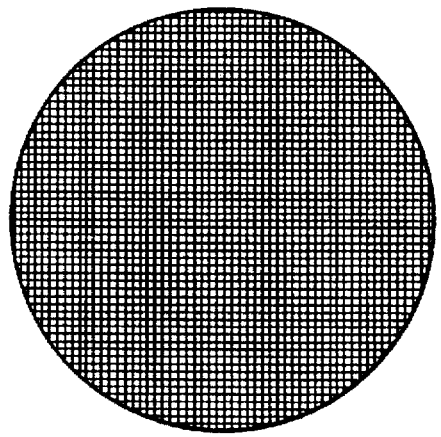
FIG. 2B shows a screen used in the screening.

FIG. 2A shows a roll crusher-type comminuting apparatus for ceramic recycling, in which 1 denotes a comminuting machine, 2 a roll crusher, 3 recycling material, 4 a vibration screen, 5 recycled material, and 6 material to be wasted. FIG. 2B shows a metal mesh screen with a mesh size of 1 mm.

The crushed material was then subjected to size separation under conditions of a size of screen opening of 1 mm, a frequency of vibrations at 40 Hz (an acceleration of vibration of 0.18 G), and a capacity of screening of 30 kg/min, thereby removing 26 kg of the comminuted material having particle diameters of less than 1 mm while retaining 62 kg of the comminuted material having particle diameters of not less than 1 mm to less than 3 mm and 12 kg of the comminuted material having particle diameters of not less than 3 mm.

Water was added to the comminuted material having particle diameters of not less than 1 mm, and the mixture was kneaded to prepare a reprocessed clay. The reprocessed clay was extruded using a die. The extrudate is a honeycomb structure having a rib thickness of 0.18 mm and a number of cells per $cm^2$ of about 62.

Thereafter, the honeycomb structure was dried in a high-frequency dryer and then fired at 1400° C. for 5 hr, thereby preparing a cordierite ceramic body in a honeycomb form.

The cordierite ceramic body thus obtained had a coefficient of thermal expansion of $0.6 \times 10^{-6}$/°C. at 40° to 800° C.

A catalyst for the purification of an exhaust gas was supported on the cordierite ceramic body, mounted on an exhaust gas purification device for automobiles, and tested in the same manner as used in the conventional exhaust gas purification devices. As a result, the cordierite ceramic body produced using a recycled material in the present example had excellent durability and heat resistance as with the conventional cordierite ceramic bodies.

Table 1: Composition of recycled material

| Ingredients | | (wt %) |
| --- | --- | --- |
| Ceramic material | Kaolin | 35 |
| | Talc | 27 |
| | Alumina | 4 |
| | Aluminum hydroxide | 12 |
| Organic binder | Methyl cellulose | 3 |
| | Water | 19 |

Example 2

In this example, as shown in FIG. 1, the relationship between the size of comminuted material particles obtained in the step of size separation and the coefficient of thermal expansion of cordierite ceramic bodies was determined.

In the size separation of the comminuted material, the size of screen opening was varied in the range of from 0.5 to 4 mm. Cordierite ceramic bodies were prepared in the same manner as in Example 1, except that individual fractions of the comminuted material were separately used. The average coefficient of thermal expansion of the cordierite ceramic bodies at 40° to 800° C. was measured. The results were as shown in FIG. 1.

As can be seen from FIG. 1, when comminuted material having particle sizes of not less than 1 mm was used, the resultant cordierite ceramic bodies had a low coefficient of thermal expansion. On the other hand, when comminuted material having particle sizes of less than 1 mm was used, the coefficient of thermal expansion of the resultant cordierite ceramic body increased rapidly with reduced the particle size of the comminuted material used. This demonstrates that a cordierite ceramic body having a low coefficient of thermal expansion comparable to that of conventional cordierite ceramic bodies can be prepared by subjecting a comminuted material to size separation to remove the comminuted material having particle diameters of less than 1 mm with the comminuted material having particle diameters of not less than 1 mm being retained and using only the comminuted material having particle diameters of not less than 1 mm for the production of the cordierite ceramic body.

What is claimed is:

1. A process for producing a cordierite ceramic body from an unfired recycled material recovered in the course of the production of a prior cordierite ceramic body, comprising the steps of:

comminuting the recycled material to prepare a comminuted material;

removing fine particles with diameters of less than 1 mm from the comminuted material to isolate remaining coarse particles with diameters of substantially not less than 1 mm;

adding water to the remaining coarse particles to form a mixture and kneading the mixture to prepare reprocessed clay;

forming the reprocessed clay into a shape; and firing the shape to produce the cordierite ceramic body.

2. The process according to claim 1, wherein the comminuted material is subjected to size separation to remove the fine particles with diameters of less than 1 mm while retaining the coarse particles with diameters of substantially not less than 1 mm.

3. The process according to claim 1, wherein the comminuted coarse particles obtained have diameters ranging from substantially not less than 1 mm to 200 mm.

4. The process according to claim 2, wherein conditions for the size separation comprise an amount of the comminuted material of 100 kg, a size of screen opening of substantially not less than 1 mm, an acceleration of vibration of 0.1 G, and a capacity of screening of 30 kg/min.

* * * * *